H. F. SCHMIDT.
PACKING.
APPLICATION FILED FEB. 3, 1919.
1,425,548.
Patented Aug. 15, 1922.
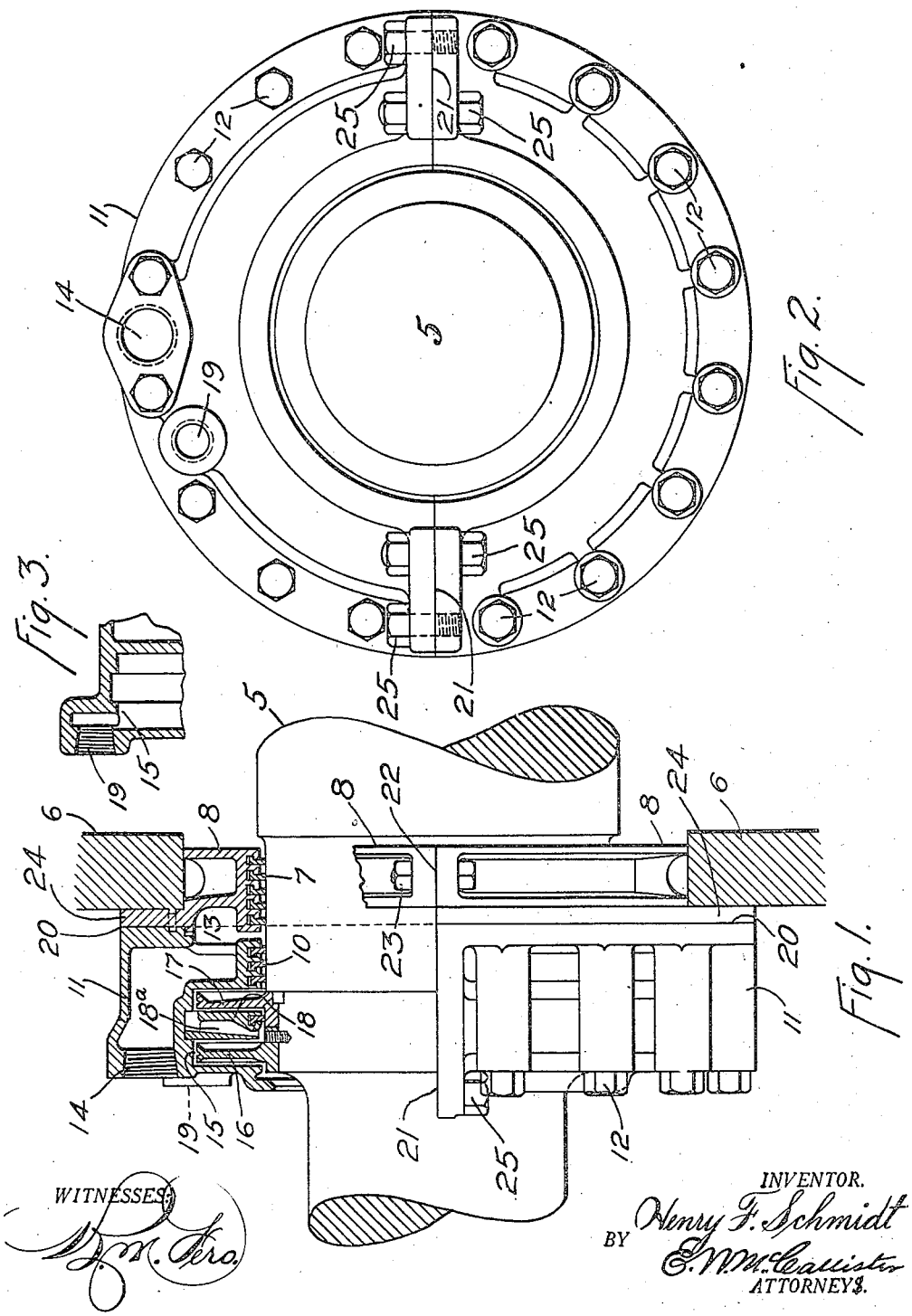

UNITED STATES PATENT OFFICE.

HENRY F. SCHMIDT, OF PITTSBURGH, PENNSYLVANIA, ASSIGNOR TO THE WESTINGHOUSE ELECTRIC & MANUFACTURING COMPANY, A CORPORATION OF PENNSYLVANIA.

PACKING.

1,425,548.   Specification of Letters Patent.   Patented Aug. 15, 1922.

Original application filed February 23, 1917, Serial No. 150,403. Divided and this application filed February 3, 1919. Serial No. 274,676.

*To all whom it may concern:*

Be it known that I, HENRY F. SCHMIDT, a citizen of the United States, and a resident of Pittsburgh, in the county of Allegheny and State of Pennsylvania, have made a new and useful Invention in Packing, which is a division of application Serial No. 150,403, filed February 23, 1917, and of which the following is a specification.

This invention relates to packing and has for an object to produce a new and improved packing gland for sealing the joint between a rotating member, such as a turbine shaft and a stationary member such as a turbine casing or stator.

A further object is to produce a packing gland for a turbo machine and pumps which may be opened for inspection or cleaning, or which may be removed from the machine for repairs without disturbing other elements.

A further object is to produce a turbine packing gland casing for enclosing a packing gland having centrifugal impellers outside the turbine casing and packing rings within the turbine casing, divided in such manner that the casing may be removed without interference with the impellers or without altering the relative positions of the rotor and turbine casing.

These and other objects which will be made apparent throughout the further description are attained by means of a packing device embodying the features herein described and illustrated in the drawings accompanying and forming a part hereof. One embodiment of the invention is illustrated in the accompanying drawing wherein—

Fig. 1 is partially in side elevation and partially in section of a packing gland embodying my invention and shown in connection with a fragmental section of a turbine casing and a fragmental elevation of a turbine shaft.

Fig. 2 is an end elevation of the packing gland showing the line of division of the casing.

Fig. 3 is a vertical section of a fragment of the casing illustrated in Fig. 1.

Centrifugal liquid sealing devices or packings are old and familiar to those skilled in the art. In connection with turbines, for example, they commonly include a runner or impeller attached to the turbine shaft and adapted to operate in a closed annular chamber attached to or forming a part of the turbine casing. In operation the centrifugal action of the rotating impeller forces the water supplied to the annular chamber against the outer wall of the chamber with considerable force. Pressure of the water in the water annulus prevents air from leaking into the turbine around the impeller and then along the shaft under high vacuum conditions, or steam from leaking out of the turbine under atmospheric exhaust or back pressure conditions.

In my copending application for Letters Patent, Serial No. 150,403, for packing, I have shown such impellers mounted outside the turbine casing where they may be readily assembled and inspected. These packing elements are supplemented with a series of packing rings in a manner similar to the arrangement shown in Fig. 1 of the drawings herein, and it is one of the principal objects of this invention to produce a suitable casing for the packing gland which may be removed from the turbine for the purpose of inspection or repairs without disturbing the remaining elements of the gland or turbine. To accomplish this object, the gland casing is divided into four sections in a manner hereinafter described.

Fig. 1 illustrates in fragmental elevation a turbine shaft 5 at a point where it passes through the turbine casing 6. To prevent the leakage of steam or air past this point I have shown a packing including both a steam sealed packing section and a liquid, or water, sealed packing section. The steam sealed packing section is provided with a number of segmental rings 7, which are pressed against the shaft 5 or held in close proximity to it by springs or other means not shown. As shown, these rings 7 are mounted in the inner section 8 of a split casing, which is secured to the turbine casing 6 in any suitable manner. Outside of the group of rings 7, along the shaft 5, I have shown a second group of similar rings 10, which are held in similar relation to the shaft 5 by means of the outer section 11 of the split casing. The outer casing section 11 is bolted directly to the inner casing section 8 by means of bolts 12, which may be employed in securing the casing section 8 in place. The casing section 11 is formed so as to leave an annular chamber 13 between the two groups of rings 7 and 10. A port 14 communicates with the annular chamber 13, and is used as a steam inlet when the turbine is operated under vacuum, and for a leak off when the turbine is operated with back pressure or atmospheric exhaust.

I have also shown the outer casing section 11 as forming an annular chamber 15, in which two impellers or runners 16 and 17 operate. The impellers are, of course, mounted on the shaft 5 of the turbine. Direct communication between the impellers 16 and 17 is prevented by a partition wall 18, although a communicating passage 18ª in this partition is adapted to conduct liquid from the outer periphery of the impeller 17 to the inner portion of the impeller 16, or vice versa. An inlet port 19 is shown through which a liquid, such as water, may be admitted to the chamber 15.

The operation of the steam sealed section is as follows: Under vacuum operating conditions the atmospheric pressure tends to force air into the turbine casing 6 along the shaft 5. Steam is supplied to the annular chamber 13 between the two groups of segmental rings 7 and 10 at a pressure somewhat higher than that of the atmosphere. This steam works past the rings along the shaft 5 with great difficulty because of the proximity of the rings to the shaft 5. However, the pressure of steam in the annular chamber 13 at a pressure greater than atmospheric pressure insures the exclusion of air from any point inside of the last few rings 10 of the outer group. Hence only steam can leak from the point of highest pressure, the annular chamber 13, into the turbine casing 6, where it is immediately drawn into the condenser. The quantity of steam which can leak past the inner rings 7 is, of course negligible, so that little steam is required for the packing. Under back pressure or atmospheric exhaust conditions the pressure of the steam within the turbine casing is greater than the pressure of the outside air, hence steam tends to work its way out of the casing along the shaft 5. The flow of the steam is impeded by the rings 7 as before and what little steam does leak past these rings is passed off to the atmosphere from the annular chamber 13. The outer group of rings 10 prevents leakage from this intermediate point. It is obvious that this packing is entirely independent of the movement or speed of the turbine shaft 5, and may therefore be used at any time or under any circumstances.

Referring to Fig. 1, it will be seen that a portion of the gland casing is inserted within the turbine casing 6 while the remainder projects from the turbine casing and surrounds the centrifugal impellers 16 and 17. With this arrangement the distance between the end of the turbine casing 6 and the extreme outside face of the gland casing is less than the length of the gland casing. Therefore the rotor journal may be placed closer to the casing than would be the case were the gland casing located entirely outside the turbine casing.

In order to remove the gland casing for inspection of the gland or for the purpose of repairing the casing or the impellers, without disturbing the rotor or impellers, the casing is divided transversely of the axis of the rotor at the point 20 into two cylindrical sections or rings 11 and 8, and these sections are divided along a plane axial of the rotor at the points 21 and 22 respectively. The sections of the ring 8 are held together to form an annular packing ring support and casing, by means of bolts 23, Fig. 1, and the ring is provided with a flange 24 adapted to be held in steam tight relation with the turbine casing 6 by means of bolts or studs 12 which extend through the casing ring 11 and the flange 24 into the turbine casing 6. The sections of the casing 11 are held together by means of bolts 25 to form an annular casing for the impellers 16 and 17 and a support for the rings 10.

The casing is assembled as follows: The parts of the ring 8 are first assembled about the rotor 5 in a space between the impellers 17 and the turbine casing 6. After the parts have been joined by the bolts 23, the ring 8 is moved along the rotor shaft into the opening in the turbine casing so that a flange 24 engages the outside thereof. The parts of the ring 11 are next assembled about the rotor and after they have been joined by the bolts 25 the completed ring is secured to the turbine casing by means of the bolts 12 which serve to retain another gland in steam tight connection with the turbine casing. When it is desired to remove the casing, the bolts 12 are first removed and the parts of the ring 11 disengaged and removed from the rotor in a radial direction. The ring 8 is then moved along the rotor 5 toward the impellers until it clears the turbine casing. The parts may then be removed in a radial direction. It will be seen from the foregoing that I have produced a packing gland containing both centrifugal elements and packing rings, the casing of which may be removed from the turbine casing without disturbing either the rotor or the impellers thereof. I have also produced a packing gland that may be operated separately with steam or water, or with the two elements jointly.

While I have described and illustrated but a single embodiment of my invention, it will be apparent to those skilled in the art that various modification, changes, additions and omissions may be made in the apparatus described and illustrated without departing from the spirit and scope of the invention as set forth by the appended claims.

What I claim is:

1. The combination with a turbine rotor shaft having an impeller projecting from the shaft outside of the turbine casing, of a gland casing divided along a plane axial of the rotor adapted to be applied to the rotor between the impeller and the turbine casing and then moved longitudinally of the rotor so as to extend into the rotor casing, and a second gland casing divided along a plane axial of the rotor and adapted to surround the impeller and close the space between the impeller and the first gland casing.

2. The combination with a turbine rotor shaft having an impeller projecting from the shaft outside of the turbine casing or stator, of a gland casing adapted to surround the said impeller and extend within the turbine casing, being divided into four parts along a plane axial of the rotor and a plane transverse to the axis thereof, whereby the portion of the casing surrounding the impeller may be removed and the remaining portions may be moved longitudinally of the rotor free of the stator or turbine casing and removed without disturbing the relative adjustment of the rotor or its impeller and the turbine casing.

3. A packing gland for sealing the space between a stator and a rotor carrying centrifugal impellers comprising a casing divided into two annular sections, one of which is provided with a series of packing rings, and the other of which is provided with a second series of packing rings, and a casing for enclosing the centrifugal impellers, the said casings being adapted when joined, to form an exhaust channel between the two sets of packing rings.

4. A packing gland for sealing the space between a rotor and a stator comprising a casing divided into two annular sections, one of which is provided with a series of packing elements and the other of which forms a sealing chamber for a centrifugal impeller carried by the rotor, the said sections adapted when joined to form an exhaust channel between the sealing chamber and the series of packing elements, and a packing between the said sealing chamber and the said series of packing rings.

5. A packing gland for the joint between the rotor and stator of a turbine, comprising a rotatable impeller mounted on the rotor, and a casing surrounding said impeller and projecting into an annular space between the rotor and stator, said casing being divided into four parts along a plane axial of the rotor and a plane transverse to the axis, whereby the portion of the casing surrounding the impeller may be removed and remaining portions may be moved longitudinally of the rotor free of the stator and removed without disturbing the relative adjustment of the stator and rotor.

In testimony whereof, I have hereunto subscribed my name this 30th day of January, 1919.

HENRY F. SCHMIDT.

Witness:
M. B. GORDON.